United States Patent Office 3,041,385
Patented June 26, 1962

3,041,385
HYDROGENATION OF UNSATURATED
HYDROCARBONS
Kenneth Hugh Bourne and Peter Desmond Holmes, Sunbury-on-Thames, England, assignors to The British Petroleum Company Limited, London, England, a British joint-stock corporation
No Drawing. Filed Dec. 17, 1959, Ser. No. 860,104
Claims priority, application Great Britain Jan. 6, 1959
8 Claims. (Cl. 260—677)

This invention relates to a process for the hydrogenation of acetylenes in the presence of other unsaturated hydrocarbons.

Olefinic hydrocarbons of low molecular weight constitute the starting material for a wide variety of chemical syntheses and are obtained, on commercial scale, by the steam cracking of higher hydrocarbons. By reason of the manner of formation of these olefinic hydrocarbons they are usually contaminated by acetylenes. Although, on a percentage basis, the proportion of acetylenes is usually small, for some processes it is necessary by a pre-treatment to reduce the acetylene content to a few parts per million. A typical pre-treatment to this end consists of an extraction of the acetylenes by means of an aqueous solution of an ammonium cuprous salt.

In British patent specification 646,408 there is proposed a process for selectively hydrogenating acetylene present in small amounts in a gas comprising a lower olefin, acetylene and at least one mol of hydrogen per mol of acetylene which comprises passing said gas at a temperature within the range of 125° to 350° C. over a catalyst which has been prepared by a process which comprises treating a composition comprising nickel oxide with a hydrogen-containing reducing gas at a temperature of 200° to 600° C. and thereafter treating the reduced composition with a sulphiding agent until the sulphur content of the resulting catalyst is from 2 to 50 equivalents of sulphur per 100 equivalents of nickel.

It is a disadvantage of this proposed process that the initial cost of the catalyst is high by reason of the high content of nickel. The activation of the catalyst requires high temperatures and the reaction is carried out at high temperature under conditions such that side reactions, such as polymerisation, are favoured.

In British patent specification 800,320 there is a process for the purification of ethylene containing acetylene which comprises scrubbing the gas with water and with an aqueous solution of an alkali metal hydroxide to reduce the content of impurities, including acetylene, and then subjecting the partially purified gas, still containing some acetylene, to a selective hydrogenation in the presence of a catalyst containing a metal of the 8th group of the periodic system and drying the gas. It is stated that the preferred catalysts are nickel-containing catalysts, the hydrogenating activity of which is reduced by their method of preparation and/or by their compostion; a typical catalyst is nickel-on-kieselguhr, containing 4% of alumina, and this catalyst is employed at 100° C.

It is an object of this invention to provide an improved process for the hydrogenation of acetylenes present in hydrocarbon mixtures containing, predominantly, olefins. Other objects will appear hereinafter.

We have found that the selective hydrogenation of acetylenes, contained, in minor proportion, in other unsaturated hydrocarbons, may be effected at lower temperatures than are suitable when using catalysts specifically described hereinbefore, by the use of catalysts comprising nickel supported on the base hereinafter described.

Thus according to this invention there is provided a process for the treatment of a hydrocarbon mixture containing, predominantly, an olefin, together with a minor proportion of an acetylene (or, in total, a minor proportion of acetylenes), for reduction of the content of acetylene, which comprises passing the mixture in vapour phase with a free hydrogen-containing gas over a catalyst comprising elemental nickel supported on a base consisting essentially of sepiolite.

Preferably the mixture contains a major proportion by weight of hydrocarbons having less than 5 carbon atoms per molecule. More particularly it is preferred that the mixture is substantially free of hydrocarbons having 6 or more carbon atoms. Very suitably the process may be applied to hydrocarbon mixtures in which the olefin is ethylene and in which the acetylene is $C_2H_2$: preferably the ethylene constitutes a high proportion of the mixture, suitably constituting over 95 mol percent of the mixture.

Sepiolite is a commercially available clay mineral, which occurs naturally and which can also be prepared synthetically. It has the ideal formula

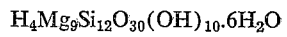

$$H_4Mg_9Si_{12}O_{30}(OH)_{10} \cdot 6H_2O$$

and is also known as meerschaum. Further information on sepiolite and its properties may be found in "Chemistry and Industry" of November 16, 1957, at pages 1492 to 1495.

The preparation of the catalyst and its activation may be carried out in any convenient manner, the following three methods being merely illustrative.

(a) The catalyst may be prepared on the base by an impregnation technique by dissolving in water a nickel salt, for example nickel nitrate, and impregnating the support material with it. The support material may be conveniently in the form of granules, or pellets of any desired size formed from ground support material. After impregnation, the catalyst is dried and is then in a form in which it can be stored if desired for long periods without deterioration. In order to use the catalyst, it must be activated by heating to decompose the salt; in the case of the nitrate this requires a temperature of about 550° C., and the nickel will be converted to the oxide. Final activation by reduction to metallic nickel can be carried out in a stream of hydrogen or hydrogen-containing gas at a temperature of 150° to 600° C. The time of treatment depends upon the temperature. Typical conditions are 16 hours at 500° C.

Sepiolite possesses an advantage over some commonly used bases, for example, alumina, in that there is no reaction of the nickel salt with sepiolite during the heating of the catalyst to reduce the nickel nitrate to oxide, and the final reduction can be carried out at a lower temperature than that necessary for nickel-alumina catalysts. No damage results to the sepiolite however, if it is heated at a temperature above 600° C.

(b) The catalyst may be prepared by milling dry nickel formate with powdered catalyst support, and the mixture subsequently pelleted. The advantage of this method of preparation is that a salt such as nickel formate reduces directly to nickel (without going through the oxide state) in a non-oxidising atmosphere, for example in an inert gas or hydrogen stream at a temperature of 150° to 300° C. At 250° C. treatment for 4 hours will usually be appropriate. This method has the advantage that it is not necessary to heat large quantities of catalysts to temperatures of 500° C. and higher.

(c) The catalyst may be prepared by a technique which utilises the water soluble complex formed when nickel formate dissolves in ammonia. This complex breaks down on heating to give nickel formate again. By using this water-soluble complex, catalysts may be prepared by the impregnation technique from normally water insoluble compounds such as nickel formate. To prepare a catalyst by this method nickel formate is dissolved in ammonia solution, and the solution used for the impregnation of granules or pellets of the support material. The catalyst is then dried, and activation is carried out by the method described under (b).

After the reduction, the nickel catalyst should not be allowed to come into contact with air or spontaneous oxidation of the nickel to nickel oxide may occur.

In carrying out the process of this invention the feedstock is blended with a hydrogen-containing gas and passed over the catalyst. Preferably commercially pure hydrogen is employed; if desired, however, for example when using a feedstock which already contains substantial amounts of inerts, hydrogenation may be carried out using a gas consisting of hydrogen together with inert constituents. Preferably, when inert constituents are present, the gas, before blending, contains at least 25 mol percent of hydrogen, the proportion suitably lying within the range 25–90 mol percent of hydrogen. Suitably a gas is employed containing 70 mol percent of hydrogen. A typical gas will consist of 70 mol percent of hydrogen and 30 mol percent of methane. Of the gases containing inert constituents, a preferred gas is a platformer tail gas. Other suitable gases are steam cracker tail gas, catalytic cracker tail gas and tail gas derived from the dehydrogenation of hydrocarbons.

The hydrogenation may conveniently be carried out at a temperature in the range 0° to 200° C. and preferably in the range 20–100° C., and at a pressure in the range 0 to 1000 p.s.i.g.

The amount of hydrogen employed will usually constitute 0.5–5 mol percent of the blend of hydrogen and feedstock. Clearly the amount will be determined in part by the nature of the feedstock and either higher or lower proportions may, in certain cases, be found to be preferable.

As will be apparent from the following examples, a wide range of space velocities is possible; preferably space velocities greater than 1000 vol./vol./hour are employed.

The selection of the desired combination of reaction conditions will be dependent, in part, upon the percentage conversion of acetylene which is desired; it will be understood that the removal of trace amounts of acetylene may necessitate the loss of some olefin. Losses of olefins may be reduced by reducing the excess of hydrogen over that required to hydrogenate the acetylene. By way of illustration, in the treatment of ethylene containing $C_2H_2$, using commercially pure hydrogen at 1.7 mol percent of the blend of feedstock and hydrogen, reaction temperature at 62° C., reaction pressure at 100 lbs./sq. in. gauge, and a space velocity of 2000 vol./vol./hour over a nickel-on-sepiolite catalyst, acetylene may be reduced from 2600 to less than 2 p.p.m. with a loss of less than 1.5 mol percent of the ethylene.

The invention is illustrated but in no way limited with respect to the following examples.

The feedstocks employed were commercial ethylenes having the following compositions:

|  | Feed A, mol percent | Feed B, mol percent |
|---|---|---|
| Methane | 0.74 | 0.9 |
| Ethane | 1.30 | 1.6 |
| Ethylene | 97.70 | 97.2 |
| Acetylene | 0.26 | 0.3 |

Blends were made of these feedstocks with hydrogen. For Examples 1, 2 and 4, Feed A was employed; for Example 3, Feed B was employed.

The catalyst employed consisted of nickel formate on sepiolite, in the form of granules of the following size:

Examples 1–3 _____ 6–12 mesh (BSS).
Example 4 _____ 12–18 mesh (BSS).

The catalyst was activated by treatment at atmospheric pressure in a stream of hydrogen at 250° C. for 4 hours and, after activation, contained 10% by weight of nickel in elemental form.

The catalyst was treated in the reactor with hydrogen, cooled to 20–30° C.; excess hydrogen was purged with nitrogen and plant operating pressure obtained by admitting feedstock. The blends were then passed over the activated catalysts at various pressures and space velocities. During each run the temperature was gradually increased and samples of product taken at suitable intervals. The gaseous products were analysed for hydrocarbon content by gas chromatography and for acetylene by infra-red spectroscopy (Examples 1–3) or by a colourimetric method (Example 4).

EXAMPLE 1

The feedstock was a blend of 95 mol percent of commercial ethylene (Feed A) and 5 mol percent of hydrogen. The blend was passed over the catalyst at a gaseous feed rate of 2000 vol./vol./hour and a pressure of 100 lbs./sq. in. gauge. The temperature rose from 33 to 62° C. during a 5½ hour run.

The product obtained during this run, at specified temperatures contained the amounts of ethane shown in Table 1.

Table 1

| Temperature, ° C.: | Ethane, mol percent |
|---|---|
| 33 | 6.09 |
| 40 | 6.06 |
| 52 | 6.10 |
| 55 | 6.15 |
| 62 | 6.13 |

The product, at all reaction temperatures shown above contained less than 40 p.p.m. of acetylene.

Thus the conversion of ethylene to ethane remained substantially constant at 4.9–5.0 mol percent, the conversion of acetylene being greater than 94.7 mol percent.

EXAMPLE 2

This example illustrates the effect of varying the conditions of activation of the catalyst by treatment with hydrogen.

The catalyst employed in run No. 161 was nickel formate on sepiolite, activated by treatment with hydrogen at 250 vol./vol./hr.

The catalyst employed in run No. 162 was a nickel formate on sepiolite activated by treatment with hydrogen at 1200 vol./vol./hr. In both runs the feedstock blend contained 95 mol percent of commercial ethylene (Feed A) and 5 mol percent of hydrogen, the gaseous feed rate being 2000 vol./vol./hr. and the reaction pressure being 100 lbs./sq. in. gauge. Results obtained were as shown in Table 2.

Table 2

| Run No. | Temperature, ° C. | Product Analysis | | Conversion, mol percent | |
|---|---|---|---|---|---|
| | | Ethane, mol percent | Acetylene, p.p.m. | Ethylene | Acetylene |
| 161 | 60 | 1.30 | 2,300 | 0 | 11.5 |
| | 76 | 1.40 | 2,100 | 0.1 | 19.2 |
| | 86 | 1.56 | 1,600 | 0.27 | 38.5 |
| | 55 | 6.15 | <20 | 4.97 | >99.3 |
| | 62 | 6.13 | <20 | 4.95 | >99.3 |
| 162 | 52 | 6.10 | <20 | 4.91 | >99.3 |
| | 40 | 6.06 | <20 | 4.87 | >99.3 |
| | 33 | 6.09 | =20 | 4.90 | =99.3 |

EXAMPLE 3

This example illustrates the effect on ethylene conversion of variations in the mol percent of hydrogen employed in a blend of commercial ethylene (Feed B) and hydrogen. In all runs the gaseous feed rate was 2000 vol./vol./hour and the reaction pressure uses 100 lbs./sq. in. gauge.

The catalyst employed in run No. 170 was a fresh nickel formate on sepiolite catalyst, activated by treatment with hydrogen at 2200 vol./vol./hour.

This catalyst was subsequently employed in runs Nos. 171–173.

The results obtained are shown in Table 3.

Product analysis showed the presence of less than 20 p.p.m. of acetylene in all cases, representing a conversion greater than 99.3 mol percent.

Table 3

| Run No. | Hydrogen content of blend (mol percent) | Temperature (° C.) | Product Analysis Ethane (mol percent) | Conversion of Ethylene (mol percent) |
|---|---|---|---|---|
| 170 | 1.0 | 24 | 2.36 | 0.78 |
|  |  | 42 | 2.34 | 0.76 |
|  |  | 60 | 2.31 | 0.73 |
| 171 | 2.2 | 44 | 3.56 | 2.02 |
|  |  | 58 | 3.48 | 1.93 |
|  |  | 75 | 3.41 | 1.86 |
| 172 | 4.5 | 40 | 5.78 | 4.30 |
|  |  | 62 | 5.24 | 3.74 |
|  |  | 74 | 5.66 | 4.18 |
| 173 | 5.8 | 34 | 7.07 | 5.63 |

EXAMPLE 4

This example illustrates the use of a catalyst in the form of granules of a size smaller than was employed in Examples 1–3.

In small scale operation this was found to give an improved catalyst bed, less subject to channelling; in large scale operation it is probable that the improved operation to be noted in the results of the present example would be achieved using a catalyst of the size employed in Examples 1–3.

The analysis of acetylene, which in Examples 1–3 was carried out by infra red spectroscopy, was, in the present example, carried out by a colourimetric method. By the latter method improved accuracy was obtained giving estimations down to 2 p.p.m.

The feedstock was a blend of 98.3 mol percent of commercial ethylene (Feed A) and 1.7 mol percent of hydrogen.

The catalyst was nickel formate on sepiolite, activated by treatment with hydrogen at 2500 vol./vol./hr.

Results obtained are shown in Table 4.

Table 4

| Pressure, p.s.i.g. | Gaseous Space Velocity, vol./vol./hr. | Temperature, ° C. | Product Analysis | | Conversion (mol percent) | |
|---|---|---|---|---|---|---|
|  |  |  | Ethane, mol percent | Acetylene, p.p.m. | Ethylene | Acetylene |
| 100 | 2,000 | 62 | 2.76 | <2 | 1.49 | >99.92 |
| 50 | 2,000 | 65 | 2.78 | <2 | 1.51 | >99.92 |
| 50 | 7,500 | 77 | 2.75 | 3–4 | 1.48 | 99.85 |

We claim:
1. A process for the treatment of a hydrocarbon mixture containing, predominantly, an olefin, together with a minor proportion of an acetylene, for reduction of the content of acetylene, which comprises passing the mixture in vapour phase with a free hydrogen-containing gas and at a temperature of 20–100° C., over a catalyst prepared by impregnating a base consisting essentially of sepiolite with a water-soluble complex formed by dissolving nickel formate in aqueous ammonia solution, decomposing the water-soluble complex of the impregnated sepiolite base to nickel formate by the application of heat to the impregnated base, and activating the nickel formate-on-sepiolite base to reduce the nickel formate directly to elemental nickel, by treating the base with a stream of non-oxidizing gas at a temperature of 150° to 300° C., and at a space velocity of said stream of greater than 250 vol./vol./hr.

2. A process as specified in claim 1 in which the hydrocarbon mixture contains, predominantly, ethylene, together with a minor proportion of $C_2H_2$.

3. A process as specified in claim 2 in which the hydrocarbon mixture contains over 95 mol percent of ethylene.

4. A process as specified in claim 1 in which the hydrocarbon mixture is passed over the catalyst with a gas containing hydrogen and inert constituents.

5. A process as specified in claim 4 in which the gas is a tail gas selected from the group consisting of tail gases derived by platforming, steam cracking, catalytic cracking and by the dehydrogenation of hydrocarbons.

6. A process as specified in claim 1 in which the temperature lies in the range of from about 24° to about 77° C.

7. A process as specified in claim 1 in which the hydrogenation pressure lies in the range 0 to 1000 lbs./sq. in. gauge.

8. A process as specified in claim 1 in which the hydrogenation space velocity is greater than 1000 vol./vol./hr.

References Cited in the file of this patent

UNITED STATES PATENTS

| | | |
|---|---|---|
| 2,359,759 | Hebbard et al. | Oct. 10, 1944 |
| 2,451,327 | Fasce et al. | Oct. 12, 1948 |
| 2,511,453 | Barry | June 13, 1950 |
| 2,836,635 | Gothel et al. | May 27, 1958 |